H. JONES.
BRAKE HEAD AND SECURING KEY FOR BRAKE SHOES.
APPLICATION FILED OCT. 7, 1912.
1,068,664.
Patented July 29, 1913.
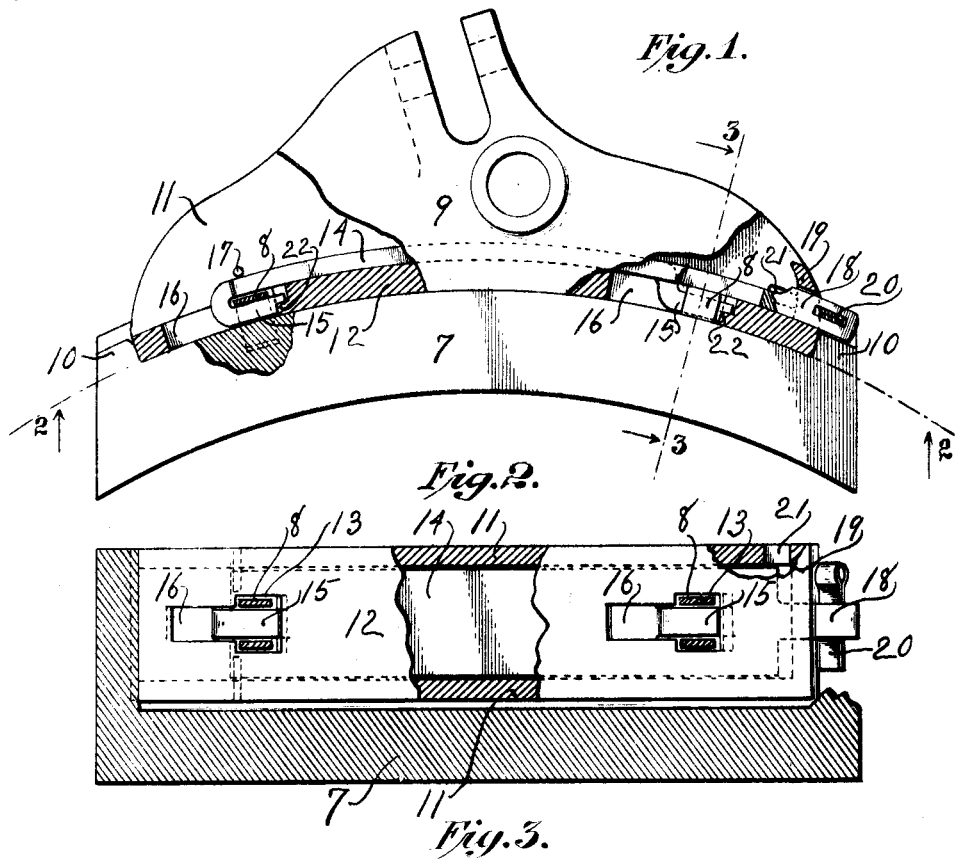
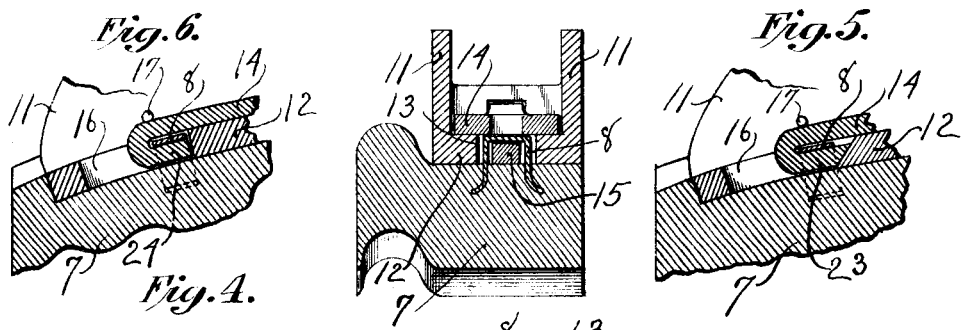
Attest:
J. C. Mitchell
R. N. Flint
Inventor:
Harry Jones
by George Cook, Atty

UNITED STATES PATENT OFFICE.

HARRY JONES, OF SUFFERN, NEW YORK, ASSIGNOR, BY MESNE ASSIGNMENTS, TO AMERICAN BRAKE SHOE & FOUNDRY COMPANY, OF MAHWAH, NEW JERSEY, A CORPORATION OF NEW JERSEY.

BRAKE-HEAD AND SECURING-KEY FOR BRAKE-SHOES.

1,068,664. Specification of Letters Patent. Patented July 29, 1913.

Application filed October 7, 1912. Serial No. 724,258.

*To all whom it may concern:*

Be it known that I, HARRY JONES, a citizen of the United States, and a resident of Suffern, in the county of Rockland and State of New York, have made and invented certain new and useful Improvements in Brake-Heads and Securing-Keys for Brake-Shoes, of which the following is a specification.

My invention relates to brake heads for supporting brake shoes in position adjacent the wheels of locomotives, cars, or other railway vehicles; and to securing keys by means of which the shoes are secured to the heads; and the object thereof is to provide a brake head and securing key designed to permit the use therewith of a brake shoe having an attaching lug (by means of which the shoe is secured to the brake head by means of a key as will be understood) of minimum height, or to permit the use of an attaching lug of much less height than the lug with which brake shoes are at present commonly provided.

In replacing a worn brake shoe with a new one in accordance with the practice and construction of shoe at present obtaining, the brake head must be moved away from the periphery of the wheel a distance sufficient to permit the new shoe to be placed in position between the head and the wheel, which distance is obviously at least equal to the thickness of the new shoe plus the height of the projecting attaching lug of the shoe, from which it follows that any scheme whereby the use of an attaching lug of less height may be employed reduces the distance that the head must be moved away from the tread surface of the wheel; which is a feature of importance, particularly in the case of shoes operating upon the driving wheels of locomotives, as in such cases the permissible movement of the head away from the periphery of the wheel is often extremely limited in amount.

In view of the premises, and with the objects above referred to and such other objects as will hereinafter appear in view, my invention consists in the improved brake head and securing key for attaching a brake shoe thereto and holding it in place, illustrated in the accompanying drawing and hereinafter described and claimed, and in such variations and modifications thereof as will be obvious to those skilled in the art to which my invention relates.

In the drawing wherein the preferred embodiment of my invention is illustrated: Figure 1 is a view showing my improved brake head and securing key for brake shoes, in connection with a brake shoe, in side elevation, portions being broken away to show features of internal construction; Fig. 2 is a view showing a section upon a curved surface indicated by the line 2—2, Fig. 1, looking up, certain parts being broken away to illustrate features of construction otherwise hidden; Fig. 3 is a view showing a section upon a transverse plane indicated by the line 3—3, Fig. 1, looking in the direction indicated by the arrows; Fig. 4 is a view similar to Fig. 2 but showing a slightly modified form of my invention; and, Figs. 5 and 6 are fragmentary views illustrating two other of the various modifications thereof.

In the accompanying drawing wherein the preferred embodiment of my invention is illustrated, the reference character 7 designates a brake shoe of usual or common form and the rear portion or back of which is provided with one or more attaching lugs 8 by means of which the same may be secured to and supported from the brake head 9 by means of a suitable key as hereinafter explained. The brake shoe is provided with lugs 10 adjacent its ends against which the ends of the brake head abut, as shown, and as is the case in the standard form of brake head and shoe in common use upon railway vehicles.

The brake shoe illustrated in the drawing is of the type commonly designated as a flanged shoe, although it will be understood that the particular type of brake shoe referred to is in no way involved in my invention, and that the same is capable of use with all forms or types of shoe.

The brake head is provided with a portion or surface adapted to contact with the rear surface or back of the brake shoe to thereby support the same, as will be understood, and is shown as made up of two side flanges 11 and a bottom portion or plate 12 connecting said side flanges to thereby provide a large area of contact between the head and the back of the shoe, although the extent of said area of contact is of secondary importance and varies within wide limits in different types of shoe and head, and in accordance with various practices obtaining among the users of brake shoes. The bottom or plate 12 is provided with one or more openings 13, the number obviously being dependent upon the number of attaching lugs with which the brake shoe to be used is provided, into or through which the attaching lugs 8 of the shoe extend, as illustrated in the drawing.

The reference character 14 designates a securing key carried by the brake head and by means of which the brake shoe is held in place thereupon and which key is provided with lug engaging portions or elements 15, which elements are offset with reference to the main body portion of the key; or, as otherwise expressed, said lug engaging elements are located beneath or below the main body portion of the key. These terms of direction, however, are used for the purposes of convenience and in connection with the accompanying drawing, and are intended to include constructions of the securing key in which the lug engaging element thereof is located between the key proper, or body portion, and the brake shoe; so as to thereby bring the element of the key which engages the lug of the shoe into the immediate vicinity of the rear portion of the shoe to thereby permit the use of a comparatively short attaching lug.

The key 14 is located between the flanges 11 of the brake head illustrated and is shown as resting upon the inner surface of the connecting plate or bottom 12. The lug engaging elements 15 of the key extend into the openings 13 and into the opening of the key lugs, as best shown in Fig. 3, when a shoe is secured in position upon the head; said openings being shown as provided with extensions 16 within which the elements 15 may lie, thereby permitting the brake shoe to be locked in position, or detached, by a longitudinal movement of the key, as will be understood from Fig. 1.

The key 14 is preferably permanently retained within the brake head as by means of guides 17 and an extending portion 18 which passes through an opening provided in a wall 19 at one end of the head, which extending portion is provided with a hole through which a cotter pin or holding key 20 may extend to hold the key in place. The reference numeral 21 designates a hole through which the key 20, or other instrument, may be thrust to hold the securing key 14 in its uppermost position while a worn shoe is being removed and a new one substituted therefor. At such a time the key or equivalent implement extends through the hole 21 and the hole for the pin or key 20 at the end of the extending portion 18, as will be understood, the lug engaging elements being thus held out of the openings 13 and out of the way of the attaching lug of the shoe.

The lug engaging elements 15 are shown as formed by narrowing the end of the key 14 and bending the narrowed portion over adjacent the body of the key, and by cutting a portion of the key free along three sides and depressing the portion thus cut free, the key being commonly made from a wrought iron or mild steel plate. It is desirable that the free ends of these elements be supported by the brake head when a shoe is secured in place thereupon, as a stronger construction is thereby procured, to which end the ends of said elements are rabbeted, as shown in Fig. 1, and engage a ledge 22 formed in the bottom 12 of the head. In the form shown in Fig. 5, the free end of the lug engaging element 23 is inclined, and engages a similar inclined surface of the bottom; while in the form shown in Fig. 6 no end support is provided for the element 24.

Figs. 1 and 2 show the application of my invention to a brake head designed to support a brake shoe having an attaching lug at each end, while Fig. 4 shows the application thereof to a head designed to support a brake shoe having a central lug only. In view of the premises it will be understood that the brake head need be moved away from the periphery of the wheel a much less distance in order to replace a worn shoe by a new one, than would be the case if the attaching lug of the shoe was of such a length as to extend through the bottom 12 a distance sufficient to receive a securing key resting upon the inner surface of the bottom, as is usually the case; and that if the head be moved away from the wheel a distance sufficient merely to clear the end lugs 10 of a shoe, the same may be placed upon the tread of the wheel and brought into position by movement in the direction of its length, as the length of the projecting lug of the shoe does not exceed the height of the lugs 10. Also, and because of the fact that in my device the extent of movement of the securing key longitudinally of the brake head necessary to release a brake shoe, or to secure it to the head after it has been placed in proper position, is merely such as will move the lug engaging elements of the key out of or into the opening in the attaching lug of the shoe, it follows that my my device may be used in positions where there is not sufficient room (because of the end of the key coming into contact with some other member) to withdraw the ordinary key entirely from the attaching lug of the shoe, as by moving it a distance equal to at least one-half its length, as is necessary with the forms of securing key in ordinary use for securing the shoe to the head. This feature is of particular importance in case a brake shoe having two or more attaching lugs is used, as, in such a case and when the usual single key of a length corresponding approximately with the length of the brake head and passing through all the lugs of the shoe is employed, the key has to be moved a distance corresponding approximately with its length in order to release the shoe from the head. Finally, the securing key in the preferred form of my device being located within the brake head and permanently secured in place therein, it will not become displaced or separated from the head during the operation of removing a worn shoe and substituting an unworn shoe therefor; and, the securing key being operable from the end of the brake head, it is not necessary to work within the limited space within the head in removing or replacing a shoe, which is a feature of especial importance in cases where a shoe having two or more attaching lugs and a corresponding number of separate securing keys are used, as is at present commonly the case.

I have illustrated my device as used to secure a brake shoe in place having an attaching lug embedded in the body of the shoe. It will be understood, however, that the shoe shown is used simply to illustrate the use of my device, and that the same may be used to secure brake shoes having any kind of attaching lug whatever in place, among which forms may be mentioned shoes having a steel back embedded in the rear face of the shoe and having an attaching lug formed either integrally therewith, or formed separately and suitably secured to the back; shoes having a cast metal lug reinforced or not by wrought metal as may be preferred; and shoes having an attaching lug embedded in their body as illustrated in the drawing.

Having thus described and explained my invention, I claim and desire to secure by Letters Patent:

1. The combination with a brake head having a surface adapted to contact with the back of a brake shoe; of a securing key carried by said head and movable in a direction substantially parallel with said surface, said key having a lug engaging element offset toward the contacting surface aforesaid and which lug engaging element is adapted to engage the attaching lug of a brake shoe and serve as a support therefor, when the shoe is secured in position upon the head.

2. The combination with a brake head having a portion which contacts with the back of a shoe when the same is secured to the head; of a securing key carried by said head and movable in a direction substantially parallel with the back of the shoe, said key having a lug engaging element located beneath the main body of the key and which lug engaging element is adapted to engage the attaching lug of a brake shoe and serve as a support therefor, when the shoe is secured in position upon the head.

3. The combination with a brake head having a portion which contacts with the back of a shoe when the same is secured to the head; of a securing key carried by said head and movable in a direction substantially parallel with the back of the shoe, said key having a lug engaging element located between the main body of the key and the back of a shoe when the same is secured to said head, and which lug engaging element is adapted to engage the attaching lug of the shoe and serve as a support therefor, when the shoe is secured in position upon the head.

4. The combination with a brake head having two side flanges and a bottom portion connecting said flanges and adapted to contact with the back of a brake shoe, and which bottom portion is provided with an opening into which the attaching lug of a brake shoe may extend; of a securing key located between said side flanges and provided with a lug engaging element extending into the opening aforesaid and adapted to engage the attaching lug of a brake shoe.

5. The combination with a brake head having two side flanges and a bottom portion connecting said flanges and adapted to contact with the back of a brake shoe, and which bottom portion is provided with an opening into which the attaching lug of a brake shoe may extend; of a securing key located between said side flanges and provided with a lug engaging element located within the opening aforesaid and movable into and out of engagement with the attaching lug of a brake shoe.

6. The combination with a brake head having two side flanges and a bottom portion connecting said flanges and adapted to contact with the back of a brake shoe, and which bottom portion is provided with an opening into which the attaching lug of a brake shoe may extend; of a securing key located between said side flanges and resting upon said bottom portion and movable longitudinally of said head, and which key is provided with a lug engaging element located within the opening aforesaid and adapted to engage the attaching lug of a brake shoe; and means for retaining said key in place and for guiding it in its movements.

7. The combination with a brake head having two side flanges and a bottom portion connecting said flanges and adapted to contact with the back of a brake shoe, and which bottom portion is provided with an opening into which the attaching lug of a brake shoe may extend; of a securing key located between said side flanges and resting upon said bottom portion and movable longitudinally of said head, and which key is provided with a lug engaging element located within the opening aforesaid and adapted to engage the attaching lug of a brake shoe; and means for holding said key in either of its extreme positions.

8. A securing key for brake shoes having a main body portion curved to correspond approximately with the curvature of a brake shoe, and a lug engaging element located beneath the concave surface of said body portion and adapted to engage the attaching lug of a brake shoe.

9. The combination with a brake head adapted to support a brake shoe; of a securing key carried by said head and movable longitudinally thereof, and having a lug engaging element offset toward the back of a shoe supported by said head and adapted to engage the attaching lug of the brake shoe.

10. The combination with a brake head adapted to support a brake shoe; of a securing key carried by said head and movable longitudinally thereof, said key comprising a main body portion, and a lug engaging element located beneath said body portion and adapted to engage the attaching lug of a brake shoe.

11. The combination with a brake head adapted to support a brake shoe; of a securing key carried by said head and movable longitudinally thereof, and having a lug engaging element offset toward the back of a shoe supported by said head and adapted to engage the attaching lug thereof.

12. In a device of the character described, a brake head provided with a plate adapted to bear against the back of a brake shoe, and an attaching key extending longitudinally of said head and sliding lengthwise on said plate, and means carried by said brake head for preventing said key from becoming detached therefrom, substantially as described.

13. A brake head provided with a plate adapted to bear on and against the back of a brake shoe, a key extending longitudinally of said plate and sliding lengthwise thereon, means for preventing the detachment of said sliding key from said head, and means for holding said key against movement on said plate, substantially as described.

14. The combination with a brake head and a key permanently affixed thereto, said key extending and movable longitudinally of said head, substantially as described.

15. The combination with a brake head provided with a plate curved in the direction of its length and adapted to bear on and against the back of a brake shoe, of a key curved in the direction of its length and extending and sliding longitudinally on said curved plate, and means for preventing the detachment of said key from said plate, substantially as described.

16. The combination with a brake head constructed with a plate adapted to bear on and against the back of a brake shoe, a key permanently attached to said plate and extending and moving longitudinally thereon, lugs provided on the under side of said sliding key and extending into openings formed in said plate of the brake head, and means for locking the key against movement on said plate, substantially as described.

17. A brake head formed with a plate adapted to bear on and against the back of a brake shoe, and with side flanges extending outwardly from said plate, in combination with a sliding key resting on said plate and movable longitudinally thereon and between said side flanges, and means for preventing the detachment of said key from said plate.

18. The combination with a brake head formed with a bottom plate adapted to bear on and against the back of a brake shoe, and provided with openings therein, said head being formed with side flanges extending outwardly from said plate, of a key sliding longitudinally on said plate and between said side flanges and provided with lugs fitting in the openings in said plate, means for preventing said key from becoming detached from said plate, and means for holding said key against movement on said plate, substantially as described.

19. A brake head adapted to bear on and against the back of a brake shoe, in combination with a key attached permanently to said head, said key extending nearly the entire length of said head and movable longitudinally thereon, and means for preventing movement of the key on said brake head.

20. The combination with a brake head curved in the direction of its length, of a key curved in its length in conformity with that of said brake head and movable thereon, said key extending nearly the entire length of said brake head, and means for preventing movement of said key on said head.

21. The combination with a brake head of a key permanently attached thereto, said key extending nearly the entire length of said head and moving longitudinally thereon.

Signed at New York borough of Manhattan in the county of New York and State of New York this fifth day of October A. D. 1912.

HARRY JONES.

Witnesses:
R. N. FLINT,
H. M. WHITE.